United States Patent Office
3,642,786
Patented Feb. 15, 1972

3,642,786
MEROCYANINE DYES
Donald W. Heseltine and Lewis L. Lincoln, Rochester, N.Y., assignors to Eastman Kodak Company, Rochester, N.Y.
No Drawing. Original application May 29, 1967, Ser. No. 642,156, now Patent No. 3,519,430, dated July 7, 1970. Divided and this application Sept. 25, 1969, Ser. No. 870,856
Int. Cl. C09b 23/10
U.S. Cl. 260—240.4
12 Claims

ABSTRACT OF THE DISCLOSURE

Merocyanine dyes derived from $\beta,\beta$-naphthothiazole have been found to be excellent spectral sensitizers for silver halide emulsions. These dyes have substantially the same sensitization properties as known corresponding $\alpha$-naphthothiazole dyes. However, the $\beta,\beta$-naphthothiazole nucleus does not require the use of a carcinogenic intermediate ($\beta$-naphthylamine) in its synthesis.

This application is a division of our copending U.S. patent application Ser. No. 642,156, filed May 29, 1967, now U.S. Pat. 3,519,430.

This invention relates to new merocyanine dyes containing a naphthothiazole nucleus, useful for sensitizing silver halide photographic emulsions.

Merocyanine dyes of certain types have been known to extend the sensitivity of silver halide emulsions. Merocyanines derived from cyclic ketomethylene compounds and basic heterocyclic nuclei have been known and have included excellent photographic sensitizers. Some of these dyes have involved the use of, as intermediates in their preparation, compounds having carcinogenic properties.

An object of our invention is to provide merocyanine dyes imparting good sensitivity to silver halide emulsions to the red portion of the spectrum, requiring no carcinogenic intermediates in their preparation. Other objects of our invention will appear herein.

The new merocyanine dye compounds of our invention are represented by the following general formula:

(I) 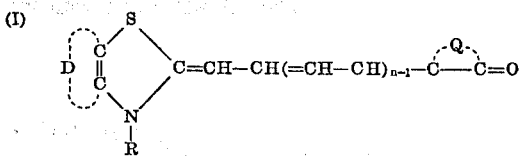

wherein $n$ represents a positive integer of from 1 to 2, R represents an alkyl group (including substituted alkyl) e.g., methyl, ethyl, propyl, isopropyl, butyl, amyl, hexyl, heptyl, octyl, nonyl, decyl, sulfoalkyl such as $\beta$-sulfoethyl, $\gamma$-sulfopropyl, $\gamma$-sulfobutyl, $\omega$-sulfobutyl etc., sulfatoalkyl such as $\beta$-sulfatoethyl, $\gamma$-sulfatopropyl, $\omega$-sulfatobutyl, etc., a carboxyalkyl such as $\beta$-carboxyethyl, $\gamma$-carboxypropyl, $\omega$-carboxybutyl, etc., when the alkyl substituent is unsubstituted it preferably contains 1 to 4 carbon atoms, similarly the alkyl portion of substituted alkyl substituents preferably contains 1 to 4 carbon atoms, D represents the atoms necessary to complete a $\beta,\beta$-naphtho nucleus and Q represents the non-metallic atoms necessary to complete a heterocyclic nucleus selected from the group consisting of (1) a heterocyclic nucleus containing 5 atoms in the heterocyclic ring and wherein 1 nitrogen atom is the only hetero atom, (2) a heterocyclic nucleus containing 5 atoms in the heterocyclic ring and wherein 2 nitrogen atoms are the only hetero atoms, (3) a heterocyclic nucleus containing 6 atoms in the heterocyclic ring and wherein 2 nitrogen atoms are the only hetero atoms, (4) a heterocyclic nucleus containing 5 atoms in the heterocyclic ring and wherein 1 nitrogen atom and 1 oxygen atom are the only hetero atoms, (5) a heterocyclic nucleus containing 5 atoms in the heterocyclic ring and wherein 1 nitrogen atom and 1 sulfur atom are the only hetero atoms and (6) a heterocyclic nucleus containing 5 atoms in the heterocyclic ring and wherein 1 sulfur atom is the only hetero atom and wherein the other nuclear atoms in said heterocyclic rings are carbon atoms.

Illustrative of a heterocyclic nucleus containing 5 atoms in the heterocyclic ring and wherein 1 nitrogen atom is the only hetero atom is an oxindole nucleus (e.g., a 1-alkyl-2,3-dihydro-2-oxindole such as
1-methyl-2,3-dihydro-2-oxindole,
1-ethyl-2,3-dihydro-2-oxindole,
1-propyl-2,3-dihydro-2-oxindole,
1-isopropyl-2,3-dihydro-2-oxindole,
1-n-butyl-2,3-dihydro-2-oxindole, etc.).

Illustrative of a heterocyclic nucleus containing 5 atoms in the heterocyclic ring and wherein 2 nitrogen atoms are the only hetero atoms are a pyrazolone nucleus such as 3-methyl-1-phenyl-2-pyrazolin-5-one,
3-ethyl-1-phenyl-2-pyrazolin-5-one,
1-phenyl-2-pyrazolin-5-one,
1-(2-benzothiazolyl)-3-methyl-2-pyrazolin-5-one, etc.,
a 2,4-imidazolinedione (hydantoin) nucleus (e.g., 2,4-imidazolinedione,
3-ethyl-2,4-imidazolinedione,
3-phenyl-2,4-imidazolinedione,
3-$\alpha$-naphthyl-2,4-imidazolinedione,
1,3-diethyl-2,4-imidazolinedione,
1-ethyl-3-phenyl-2,4-imidazolinedione,
1-ethyl-3$\alpha$-naphthyl-2,4-imidazolinedione,
1,3-diphenyl-2,4-imidazolinedione, etc.),
a 2-thio-2,4-imidazolinedione
(i.e., 2-thiohydantoin) nucleus (e.g., 2-thio-2,4-imidazolinedione,
3-ethyl-2-thio-2,4-imidazolinedione,
3-phenyl-2-thio-2,4-imidazolinedione,
3-$\alpha$-naphthyl-2-thio-2,4-imidazolinedione,
1,3-diethyl-2-thio-2,4-imidazolinedione,
1-ethyl-3-phenyl-2-thio-2,4-imidazolinedione,
1-ethyl-3-$\alpha$-naphthyl-2-thio-2,4-imidazolinedione,
1,3-diphenyl-2-thio-2,4-imidazolinedione, etc.) and a
5-imidazolinone nucleus (e.g., 2-ethylmercapto-5-imidazolinone,
2-n-propylmercapto-5-imidazolinone, etc.).

A 2,4,6-triketohexahydropyrimidine nucleus (e.g., barbituric acid or 2-thiobarbituric acid as well as their 1-alkyl (e.g., 1-methyl, 1-ethyl, 1-n-propyl, 1-n-butyl, 1-n-heptyl, etc.), or 1,3-dialkyl (e.g., 1,3-dimethyl, 1,3-diethyl, 1,3-di-n-propyl, 1,3-diisopropyl, 1,3-di-n-butyl, 1,3-di(beta-methoxyethyl), etc.), or 1,3-dicyclohexyl, or 1,3-diaryl (e.g., 1,3-diphenyl, 1,3-di-(p-chlorophenyl), 1,3-di(p-ethoxycarbonylphenyl), etc.), or 1-aryl (e.g., 1-phenyl, 1-p-chlorophenyl, 1-p-ethoxycarbonylphenyl, etc.) or 1-alkyl-3-aryl (e.g., 1-ethyl-3-phenyl, 1-n-heptyl-3-phenyl, etc.) derivatives, etc.) is illustrative of a heterocyclic nucleus containing 6 atoms in the heterocyclic ring and wherein 2 nitrogen atoms are the only hetero atoms.

Illustrative of a heterocyclic nucleus containing 5 atoms in the heterocyclic ring and wherein nitrogen atom and 1 oxygen atom are the only hetero atoms are an isoxazolone nucious (e.g., 3-phenyl - 5(4H) - isoxazolone, 3-n- such as 3-methyl-2-thio-2,4-oxazolidinedione, 3 - ethyl-2-thio-2,4-oxazolidinedione, 3-propyl-2-thio-2,4-oxazolidinedione, 3-n-butyl-2-thio-2,4-oxazolidinedione, etc., a 2-imino-2,4-oxazolinone (i.e., pseudohydantoin) nucleus such as 2-imino-2,4-oxazolinone, etc.

Illustrative of a heterocyclic nucleus containing 5 atoms in the heterocyclic ring and wherein 1 nitrogen atom and 1 sulfur atom are the only hetero atoms are a rhodanine nucleus (i.e., a 2-thio-2,4-thiazolidinedione nucleus), such as rhodanine, 3-alkylrhodanines (e.g., 3-methylrhodanine, 3-ethylrhodanine, 3-n-butylrhodanine, etc.), 3-allylrhodanine, or a 3-arylrhodanine (e.g., 3-phenylrhodanine, etc.), etc., a 2 - thio - 2,5 - thiazolidinedione nucleus (i.e., a 2-thio-2,5-(3H,4H)-thiazoledione nucleus) (e.g., 3-methyl-2-thio-2,5-thiazolidinedione, 3-ethyl-2-thio - 2,5 - thiazolidinedione, 3-propyl-2-thio-2, 5-thiazolidinedione, 3-n-butyl - 2 - thio - 2,5 - thiazolidinedione, etc.), a 2,4-thiazolidinedione nucleus such as 2,4-thiazolidinedione, 3-methyl - 2,4-thiazolidinedione, 3-ethyl-2,4-thiazolidinedione, 3 - phenyl - 2,4 - thiazolidinedione, 3-α-naphthyl-2,4-thiazolidinedione, etc., a 4-thiazolinone nucleus such as 2-ethylmercapto- - 4 - thiazolinone, 2 - propylmercapto-4-thiazolinone, 2 - n - butylmercapto - 4 - thiazolinone, 2-(alkyl-, phenyl-)amino-4-thiazolinones, e.g., 2-(methyl-, phenyl - )amino - 4 - thiazolinone, 2 - (ethyl-, phenyl-) amino-4-thiazolinone, 2-(n-propyl-, phenyl-)amino-4-thiazolinone, 2-(isopropyl-, phenyl-)amino-4-thiazolinone, 2-(n-butyl-, phenyl-)amino-4-thiazolinone, etc., 2-diphenyl-amino-4-thiazolinone, etc.

Illustrative of a heterocyclic nucleus containing 5 atoms in the heterocyclic ring and wherein 1 sulfur atom is the only hetero atom is a thianaphthenone nucleus (e.g., 3-(2H)-thianaphthenone, etc.).

Of the heterocyclic nuclei which

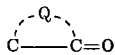

can be it is especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom and a sulfur atom.

One method by which the merocyanine dyes of Formula I above can be advantageously prepared is by reacting a β,β-naphthothiazole compound selected from those represented by the following general formula:

(II)

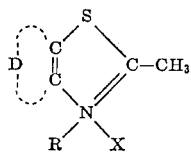

wherein D and R each have the values given above and X represents an acid anion such as chloride, bromide, iodide, perchlorate, benzenesulfonate, p-toluenesulfonate, thiocyanate, sulfamates, ethyl sulfate, methyl sulfate, etc. with a compound selected from the following general formula:

(III)

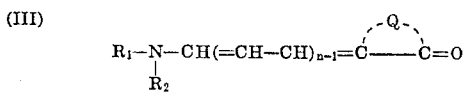

wherein Q and $n$ each have the values given above, $H_2$ represents hyrogen or an acyl group of a carboxylic acid such as acetyl, propionyl, benzoyl or the like and $R_1$ represents an aryl group of 6–12 carbon atoms such as phenyl, tolyl, diphenyl, xylyl, naphthyl or the like.

The reaction can be advantageously carried out in the presence of a basic condensing agent, e.g., an organic tertiary-amine, such as triethylamine, tripropylamine, tributylamine, N-ethylpiperidine, N,N-dimethylaniline or the like. The reaction can advantageously be effected in the presence of an inert solvent e.g., ethanol, propanol, isopropanol, dioxan, pyridine, quinoline or the like. Heating accelerates the reaction. Temperature within the range of room temperature to 100° C. can be advantageously used, the choice of a desirable reaction temperature being within the skill of the individual operator.

Another method by which the merocyanine dyes of Formula I above can be advantageously prepared is by reacting a compound selected from those represented by the following general formula:

(IV)

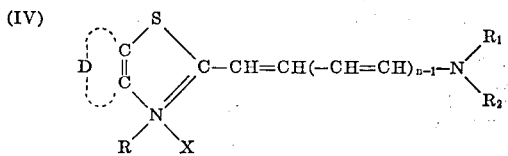

wherein $n$, D, R, $R_1$ and X are as above defined, and $R_3$ represents an acyl group of a carboxylic acid such as acetyl, propionyl, benzoyl, and the like, with a compound selected from the following general formula:

(V)

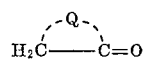

wherein Q has the values given above.

The condensation of these compounds can advantageously be accelerated by heating the reaction mixture such as temperatures within the range of ca. 20° C. to the reflux temperature of the reaction mixture. The condensation can be advantageously carried out in the presence of an inert solvent (e.g., pyridine, nitrobenzene, ethanol, propanol, isopropanol, butanol, etc.) and in the presence of a basic condensing agent such as a trialkylamine (triethylamine, tripropylamine, tributylamine or the like), an N-alkylpiperidine (e.g., N-methylpiperidine, N-ethylpiperidine or the like), an N,N-dialkylaniline (e.g., dimethylaniline, diethylaniline etc.) or the like.

Some compounds which have been useful in preparing some of the merocyanines in accordance with our invention are thiohydantoins and rhodanines.

We have found that dyes derived from 2-methylnaphtho[2,3-d]thiazole not only sensitize silver halide emulsions are like dyes derived from 2-methylnaphtho [2,1-d]thiazole (made from carcinogen β-naphthylamine) and like dyes from 2-methylnaphtho[1,2-d]thiazole (a less satisfactory sensitizer) but that the first named dyes absorb in methanol solution with a maximum 37 mµ toward shorter wave length compared to the second and third named dyes. For instance, it was noted with the following dyes (I)

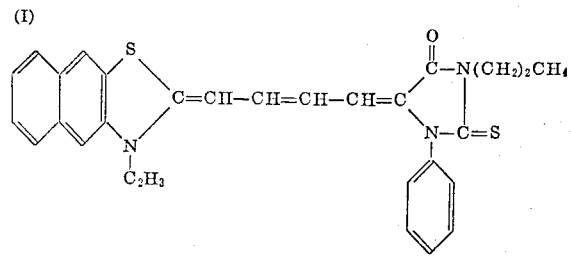

(II)

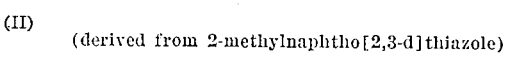

(derived from 2-methylnaphtho[2,3-d]thiazole)

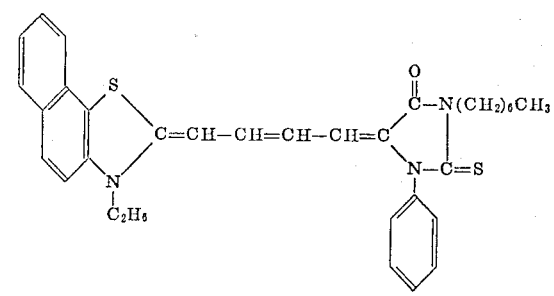

(III) (derived from 2-methylnaphtho[2,1-d]thiazole)

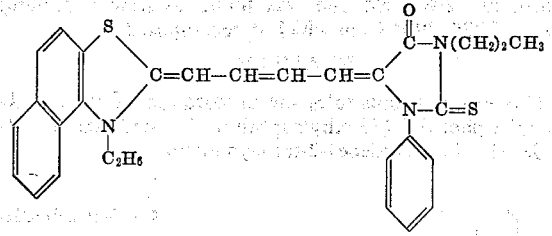

that the results were as represented in the following table:

| Dye Number | λ max. MeOH solution, mμ | Sans. max., mμ |
| --- | --- | --- |
| I | 550 | 700 |
| II | 587 | 700 |
| III | 585 | 700 |

2-methylnaphtho[2,3-d]thiazole from which the dyes in accordance with our invention are conveniently derived, may be prepared by the method described in British Pat. No. 455,535 of I. G. Farbenindustrie.

The following examples illustrate the preparation of some intermediate materials which were used in the examples illustrating the preparation of dyes in accordance with our invention:

EXAMPLE A

Preparation of anhydro - 2 - methyl-3-(2-sulfobutyl)-naphtho[2,3-d]thiazolium hydroxide:

2 grams of 2-methylnaphtho[2,3-d]thiazole and 1.36 grams of 2,4-butanesultone were mixed and the mixture was heated at 120° C. over a weekend. The hard cake which formed was ground under acetone. The pale pink solid obtained was filtered off, and was washed with acetone and dried. The yield of product was quantitative, which product was not further purified.

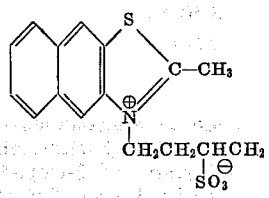

EXAMPLE B

Preparation of 3-ethyl-2-methylnaphtho[2,3-d]thiazolium-p-toluenesulfonate:

4 grams of 2-methylnaphtho[2,3-d]thiazole were mixed with 4 grams of ethyl-p-toluenesulfonate and the mass was heated at 115° C. overnight. The hard cake that formed was ground under acetone. The pale pink solid obtained was filtered off and was washed with acetone and dried. The product obtained in 95% yield was not further purified.

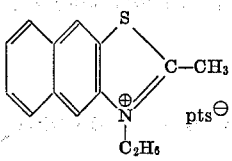

EXAMPLE C

Preparation of 2 - (4 - acetanilido - 1,3-butadienyl)-3-ethylnaphtho[2,3-d]thiazolium-p-toluenesulfonate:

39.9 grams of 3-ethyl-2-methylnaphtho[2,3-d]thiazolium-p-toluenesulfonate were mixed in acetic anhydride (100 ml.) with 28.5 grams of β-anilinoacroleinanil hydrochloride. The mixture was heated under reflux for 15 minutes. The mass was then chilled and 400 ml. of diethyl ether were added precipitating the product from solution in the form of a sticky mass. The ethereal liquid was decanted from the product. 300 ml. of ether and then 100 ml. of water were added and the two layer system was stirred for several minutes whereupon the product crystallized out in the form of yellow crystals. The mass was chilled, the crystals were filtered off, washed with acetone and dried. The product obtained in 56% yield was not further purified.

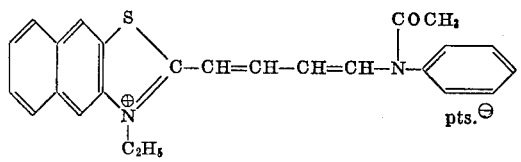

EXAMPLE D

Preparation of anhydro-2 - (4 - acetanilido - 1,3 - butadienyl)-3-(3 - sulfobutyl)naphtho[2,3 - d]thiazolium hydroxide:

16.8 grams of anhydro - 2 - methyl - 3 - (3 - sulfobutyl) naphtho[2,3-d]thiazolium hydroxide were mixed with 14.2 grams of β-anilinoacroleinanil hydrochloride and 150 ml. of acetic anhydride. The mixture was heated under reflux for 10 minutes. The mass was chilled and an excess of diethyl ether was added with stirring. The product precipitated as a dark colored solid. The ether-acetic anhydride liquid was decanted from the dark-colored product, acetone was added with stirring. The brown solid was filtered off and was washed with acetone and dried. The product obtained in 98% yield was not further purified.

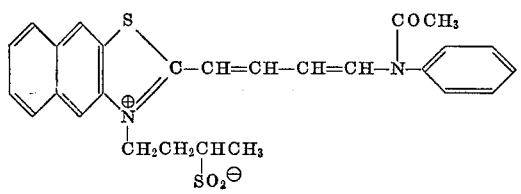

EXAMPLE 1

This is an example of the preparation of 3-ethyl-1-phenyl-5-[(3-ethylnaphtho[2,3-d]thiazolin - 2 - ylidene) ethylidene]-2-thiohydantoin

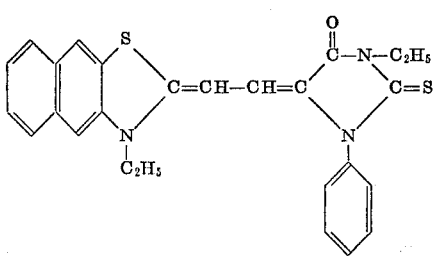

2.7 grams of 2-β-acetanilidovinyl-3-ethylnaphtho-[2,3-d]thiazolium iodide were mixed with 1.1 grams of 3-ethyl-1-phenyl-2-thiohydatoin in 50 ml. of refluxing ethyl alcohol. 1.4 ml. of triethylamine was added and the mixture was heated under reflux for 10 minutes. The mass was then chilled, the crystalline dye formed was collected on a filter, washed with methyl alcohol and dried. The product was recrystallized twice from pyradine-methyl alcohol obtaining the purified dye in 44% yield. The dye had a melting point of 262–263° C. at which it decomposed.

EXAMPLE 2

This example illustrates the preparation of the following dye 3-ethyl-1-phenyl-5-{[3-(-sulfobutyl)naphtho-[2,3 - d]

thiazolin-2-ylidene]ethylidene} - 2 - thiohydantoin, sodium salt

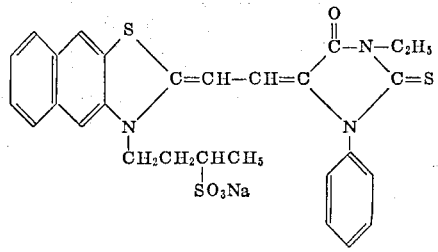

1.7 grams of anhydro - 2 - methyl - 3 - (3-sulfobutyl)naphtho[2,3-d]thiazolium hydroxide were mixed in 30 ml. of dry pyridine with 1.8 grams of 5-acetanilidomethylene-3-ethyl-1-phenyl-2-thiohydantoin. The mass was heated to reflux and 1.4 ml. of triethylamine were added. The mass then heated under reflux for 15 minutes. The mixture was then chilled and the dye formed was precipitated as the sodium salt by adding a saturated aqueous solution of sodium iodide (2 grams in water) with stirring. The solid dye thus obtained was collected on a filter and was dried. The dye was recrystallized twice with pyridine-ethyl alcohol and was obtained in 20% yield. The product had a melting point above 320° C.

EXAMPLE 3

This example illustrates the preparation of the dye 3-ethyl - 5 - {[3 - sulfobutyl)naphtho[2,3 - d]thiazolin - 2-ylidene]ethylidene}rhodanine, sodium salt

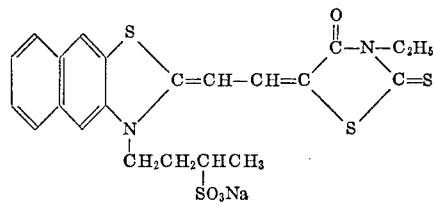

3.3 grams of anhydro-2 - methyl-3 - (3 - sulfobutyl)-naphtho[2,3-d]thiazolium hydroxide were mixed with 3.5 grams of 5-acetanilidomethylene-3-ethylrhodanine in 30 ml. of dry pyridine and the mass was heated to reflux. 2.8 ml. of triethylamine were added and the entire mixture was heated under reflux for 15 minutes. The mass was then chilled and the dye which formed was precipitated as the sodium salt by adding a saturated aqueous solution of sodium iodide (2 grams in water) with stirring. The solid dye was collected on a filter and dried. The product was recrystallized twice from pyridine-methyl alcohol and was obtained in 30% yield. The dye obtained had a melting point above 320° C.

EXAMPLE 4

This example illustrates the preparation of the dye 3-ethyl-1-phenyl-5-[(3 - ethylnaphtho[2,3 - d]thiazolin - 2-ylidene)-2-butenylidene]-2-thiohydantoin

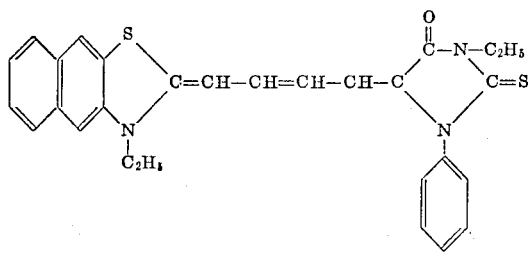

2.8 grams of 2-(4-acetanilido-1,3-butadienyl)-3-ethyl-naphtho[2,3-d]thiazolium-p-toluenesulfonate were mixed with 1.1 grams of 3-ethyl-1-phenyl-2-thiohydantoin in 50 ml. of refluxing ethyl alcohol. 1.4 ml. of triethylamine were added and the mixture was heated under reflux for 10 minutes. The mass was then chilled and the crystalline dye thus obtained was collected on a filter, washed with methyl alcohol and dried. The dye was recrystallized twice from pyridine-methyl alcohol. The purified dye was obtained in 42% yield and was found to have a melting point of 289–290° C. at which it decomposed.

EXAMPLE 5

This example illustrates the preparation of the dye 3-heptyl-1-phenyl-5-[(3-ethylnaphtho[2,3 - d]thiazolin - 2-ylidene)-2-butenylidene]-2-thiohydantoin

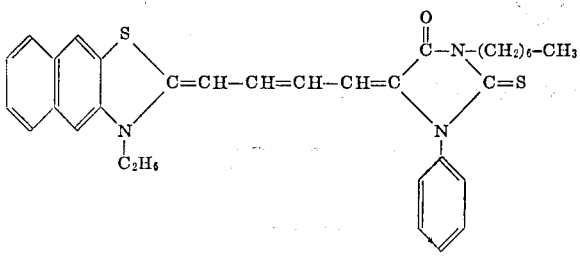

2.8 grams of 2-(4-acetanilido-1,3-butadienyl)-3-ethyl-naphtho[2,3-d]thiazolium-p-toluenesulfonate were mixed with 1.4 grams of 3-n-heptyl-1-phenyl-2-thiohydantoin in 50 parts of refluxing ethyl alcohol. 1.4 ml. of triethylamine were added and the mixture was heated under reflux for 10 minutes. The mass was then chilled and the crystalline dye which formed was collected on a filter and was washed with methyl alcohol and dried. The yield of purified dye after two recrystallizations from pyridine-methyl alcohol was 1 gram (36%) which product decomposed at its melting point of 251–252° C.

EXAMPLE 6

This example illustrates the preparation of the dye 3-ethyl-1-phenyl - 5 - {[3-(3-sulfobutyl)naphtho[2,3-d]thiazolin-2-ylidene]-2-butenylidene}-2-thiohydantoin

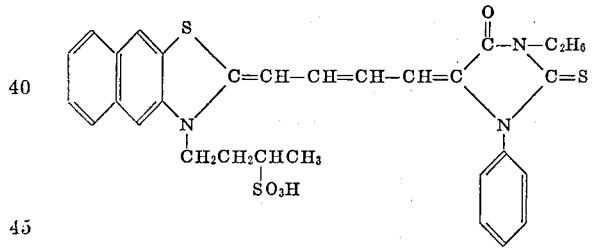

2.5 grams of anhydro-2-(4-acetanilido-1,3-butadienyl)-3 - (3 - sulfobutyl)naphtho[2,3-d]thiazolium hydroxide were mixed with 1.2 grams of 3-ethyl-1-phenyl-2-thiohydantoin in 30 parts of refluxing ethyl alcohol. 1.4 ml. of triethylamine were added and the mixture was heated under reflux for 10 minutes. The mixture was then chilled, the crystalline dye which formed was collected on a filter and was dried. The yield of purified dye after two recrystallizations from methyl alcohol was 1.1 grams (37%) which product decomposed at a melting point of 190–191° C.

EXAMPLE 7

This example illustrates the preparation of the dye 3-n-heptyl-1-phenyl - 5 - {[3-(3-sulfobutyl)naphtho[2,3-d]thiazolin-2-ylidene]-2-butenylidene} - 2 - thiohydantoin, sodium salt

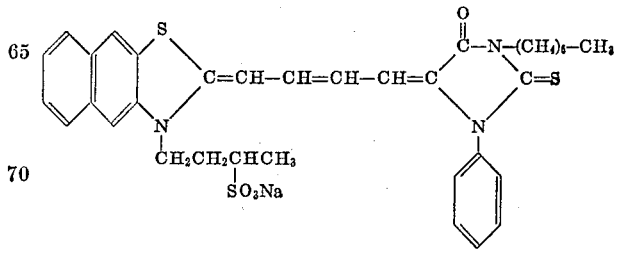

2.5 grams of anhydro-2-(4-acetanilido-1,3-butadienyl)-3 - (3 - sulfobutyl)naphthio[2,3-d]thiazolium hydroxide were mixed with 1.5 grams of 3-n-heptyl-1-phenyl-2-thiohydantoin in 30 ml. of refluxing ethyl alcohol. 1.4 ml. of triethylamine were added and the mixture was heated under reflux for 10 minutes. The mass was then chilled and the dye which formed was precipitated as the sodium salt by adding a saturated aqueous solution of sodium iodide (2 grams in water) with stirring. The solid dye thus obtained was collected on a filter and was dried. The yield of purified dye obtained after two recrystallizations from methyl alcohol was 1.2 grams (35%) which dye had a melting point above 320° C.

EXAMPLE 8

This example illustrates the preparation of the dye 3-ethyl-5'[(3-ethylnaphtho[2,3-d]thiazolin - 2 - ylidene)-2-butenylidene]rhodanine

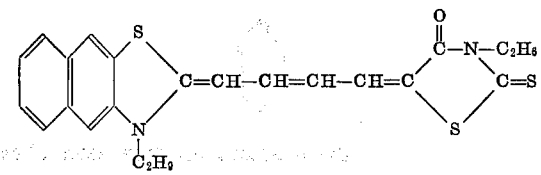

2.8 grams of 2-(4-acetanilido-1,3-butadienyl)-3-ethylnaphtho[2,3-d]thiazolium-p-toluenesulfonate were mixed with 0.9 gram of 3-ethylrhodanine in 50 ml. of refluxing ethyl alcohol. 1.4 ml. of triethylamine were added and the mixture was heated under reflux for 10 minutes. The mixture was then chilled and the crystalline dye which formed was collected on a filter, washed with methyl alcohol and dried. The yield of purified dye after two recrystallizations from pyridine-methyl alcohol was 1.3 grams (64%). The dye thus obtained had a melting point of 278–279° C., at which it decomposed.

EXAMPLE 9

This example illustrates the preparation of the dye 3-ethyl - 5 - [3-(3-sulfobutyl)naphtho[2,3-d]thiazolin-2-ylidene]-2-butenylidene rhodanine

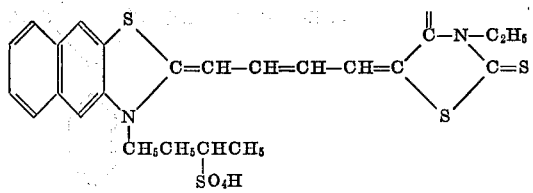

2.5 grams of anhydro-2-(4-acetanilido-1,3-butadienyl)-3-(3-sulfobutyl)naphtho[2,3-d]thiazolium hydroxide were mixed with 0.9 gram of 3-ethylrhodanine in 30 ml. of refluxing ethyl alcohol. 1.4 ml. of triethylamine were added and the mixture was heated under reflux for 10 minutes. The mixture was then chilled and the crystalline dye was collected on a filter, washed with acetone and dried. The yield of purified dye after two recrystallizations from methyl alcohol was 1 gram (37%) which dye melted at 205–206° C. at which it decomposed.

The dyes of our invention are useful in spectrally sensitizing silver halide photographic emulsions. For instance each of the dyes prepared in Examples 1–9 were incorporated in a liter of gelatin-silver bromoiodide emulsion (containing about 40 grams of silver halide) in the concentrations shown in the following table.

The resulting emulsions were then coated on a cellulose acetate film support at a coverage of 100 mg. of silver and 400 mg. of gelatin per square foot of support. A sample of each coated support was then exposed on an Eastman 1B sensitometer using a tungsten light source and processed for 6 minutes at room temperature in Kodak D–19 developer which has the following formulation:

| | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter | | then fixed, washed and dried. The sensitizing data obtained are listed in the following table.

TABLE

| Sensitizing dye of Example No. | Amount of dye per liter of emulsion, g. | Sensitizing range, mμ | Sens. max., mμ |
|---|---|---|---|
| 1 | .06 | to 630 | 570 |
| 2 | .08 | to 630 | 575 |
| 3 | .08 | to 680 | 600 |
| 4 | .03 | to 750 | 700 |
| 5 | .03 | 540–740 | 700 |
| 6 | .02 | 560–740 | 700 |
| 7 | .02 | 550–740 | 700 |
| 8 | .03 | 530–740 | 700 |
| 9 | .04 | 550–790 | 700 |

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The concentration of the new dyes in the emulsion can vary widely, e.g., from about 5 to about 100 mg. per liter of flowable emulsion. The specific concentration will vary according to the type of light-sensitive material in the emulsion and the effects desired. The suitable and most economical concentration for a given emulsion will be apparent to those skilled in the art upon making the tests and observations customarily used in the art of emulsion making.

To prepare a gelatin-silver halide emulsion sensitized with one of the dyes of this invention, the following procedure is satisfactory. A quantity of the dye is dissolved in a suitable solvent and a volume of this solution containing from 5 to 100 mg. of dye is slowly added to about one liter of a gelatin-silver halide emulsion. With most of the dyes, 10 to 20 mg. of dye per liter of emulsion suffices to produce the maximum sensitizing effect with the ordinary gelatin-silver bromide (including bromoiodide and chlorobromide) emulsions. With fine grain emulsions, which include most of the ordinarily employed gelatin-silver chloride emulsions, somewhat larger concentrations of dye may be necessary to obtain the optimum sensitizing effect. While this procedure has dealt with emulsions comprising gelatin, it will be understood that these remarks apply generally to any emulsions wherein part or all of the gelatin is substituted by another suitable hydrophilic colloid, such as previously mentioned. It will also be understood that the above description is intended to be illustrative and should not be construed as limiting my invention in any sense since it is apparent that the new dyes can be incorporated by other methods in many of the photographic silver halide emulsions and hydrophilic colloid layers customarily employed in the art. For instance, the dyes can be incorporated by bathing a plate or film bearing an emulsion layer in a solution of one of the dyes in an appropriate solvent. Bathing methods, however, are not normally preferred.

The sensitizing dyes in accordance with our invention are useful for extending the spectral sensitivity of the customarily employed silver chloride, silver chlorobromide, silver bromide, silver bromoiodide or silver chlorobromoiodide photographic emulsions.

Photographic silver halide emulsions containing the sensitizing dyes of this invention can also contain other addends such as chemical sensitizers, e.g., sulfur sensitizers (e.g., allyl thiocarbamide, thiourea, allylisothiocyanate, cystine, etc.), selenium and tellurium sensitizers, various gold compounds (e.g., potassium chlorosurate, suric trichloride, etc.) (see U.S. patents to W. D. Baldsiefen, No. 2,540,085, issued Feb. 6, 1951; R. E. Damschroder, No. 2,597,856, issued May 27, 1952; and H. C. Yutzy et al. U.S. Pat. No. 2,597,915, issued May 27, 1952), various palladium compounds, such as palladium chloride (W. D. Baldsiefen, U.S. Pat. No. 2,540,086, issued Feb. 6, 1951), potassium chloropelladate (R. E. Stauffer et al. U.S. Pat. No. 2,598,079, issued May 27, 1952), etc., or mixtures of such sensitizers; antifoggants such as ammonium chloroplatinite (A. P. H. Trivelli et al. U.S. Pat. No. 2,566,263, issued Aug. 28, 1951); benzotriazole, nitrobenzimidazole, 5-nitroindazole, benzidine, mercaptans, etc. (see Mees, "The Theory of the Photographic Process," MacMillan Pub., revised edition 1954, page 677), or mixtures thereof; hardeners, such as aldehyde hardeners, (e.g., formaldehyde) aziridine hardeners, hardeners which are derivatives of dioxane, oxy polysaccharides such as oxy starch and oxy plant gums, mixtures of these, and the like. The layers present in photographic elements made according to the invention may also contain color couplers, such as those described in I. F. Salminen et al. U.S. Pat. No. 2,423,730, issued July 8, 1947; Spence and Carroll U.S. Pat. No. 2,640,776, issued June 2, 1953; etc; or mixtures of such addends. Dispersing agents for color couplers, such as those set forth in U.S. patents to E. E. Jelley et al. U.S. Pat. No. 2,322,027, issued June 15, 1943, and L. D. Mannes et al. U.S. Pat. No. 2,304,940, issued Dec. 15, 1942; and non-ionic, anionic and amphoteric coating aids; can also be employed in the above described emulsions and colloid layers.

The emulsions sensitized by the dyes of the invention can be coated onto any of the support materials commonly used in photographic elements including glass, metals, paper, cellulose esters such as cellulose acetate, cellulose propionate, cellulose acetate butyrate, etc., synthetic film-forming resinous materials such as polystyrene, polyolefins, e.g., polyethylene, polypropylene, etc., polyesters, e.g., polyethylene terephthalate, etc., polyvinyl acetals, polyamides, and the like.

The invention has been described in considerable detail with particular reference to certain preferred embodiments thereof, but it will be understood that variations and modifications can be effected within the spirit and scope of the invention as described hereinbefore, and as defined in the appended claims.

We claim:
1. A merocyanine dye having the general formula:

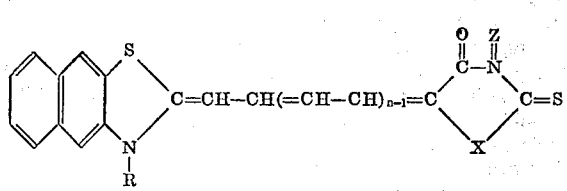

wherein $n$ represents a positive integer of from 1 to 2, R represents a low carbon alkyl hydrocarbon group or a sulfoalkyl group having 2 to 4 carbon atoms in its free acid or alkali metal form, X represents a sulfur atom or

and Z represents an alkyl hydrocarbon group having up to and including 7 carbon atoms.

2. A merocyanine dye in accordance with claim 1 wherein X is a sulfur atom.

3. A merocyanine dye in accordance with claim 1 wherein X is

4. A merocyanine dye in accordance with claim 1 having the formula:

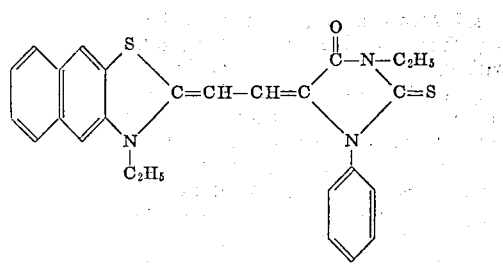

5. A merocyanine dye in accordance with claim 1 having the formula:

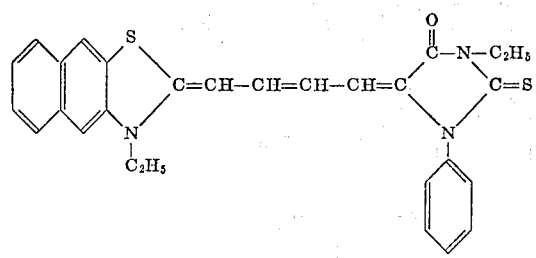

6. A merocyanine dye in accordance with claim 1 having the formula:

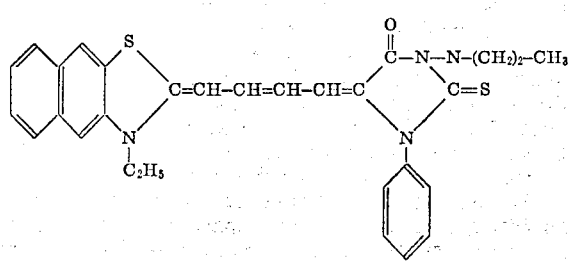

7. A merocyanine dye in accordance with claim 1 having the formula:

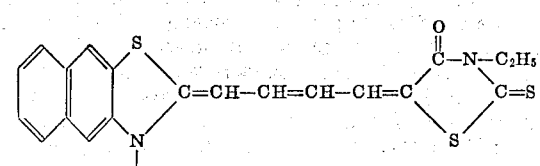

8. A merocyanine dye in accordance with claim 1 having the formula:

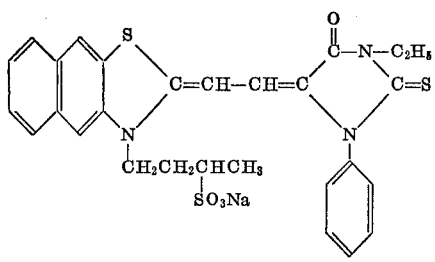

9. A merocyanine dye in accordance with claim 1 having the formula:

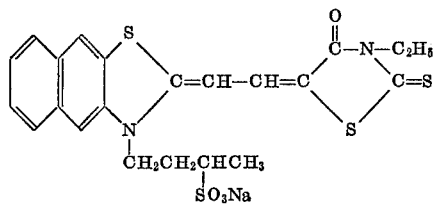

10. A merocyanine dye in accordance with claim 1 having the formula:

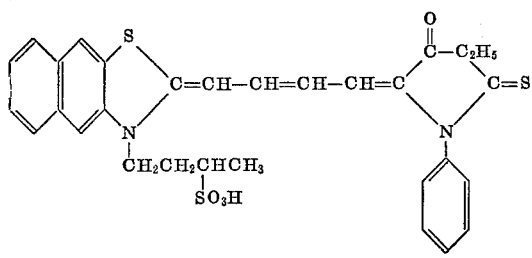

11. A merocyanine dye in accordance with claim 1 having the formula:

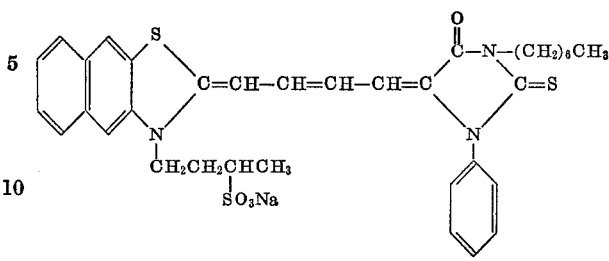

12. A merocyanine dye in accordance with claim 1 having the formula:

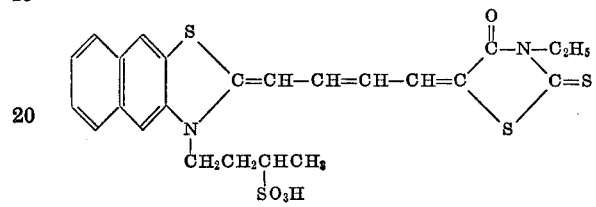

References Cited

UNITED STATES PATENTS

| | | | |
|---|---|---|---|
| 2,185,343 | 1/1940 | Keyes et al. | 260—240.4 |
| 3,384,486 | 5/1968 | Taber et al. | 96—102 |
| 3,480,439 | 11/1969 | Kampfer et al. | 96—102 |
| 3,519,430 | 7/1970 | Helseltine et al. | 96—102 |
| 3,520,693 | 7/1970 | Gotze et al. | 96—99 |

JOHN D. RANDOLPH, Primary Examiner

U.S. Cl. X.R.

96—102; 260—240.8, 304